E. NALL.
VULCANIZING PRESS.
APPLICATION FILED JULY 10, 1916.
1,242,365.
Patented Oct. 9, 1917.
2 SHEETS—SHEET 2.
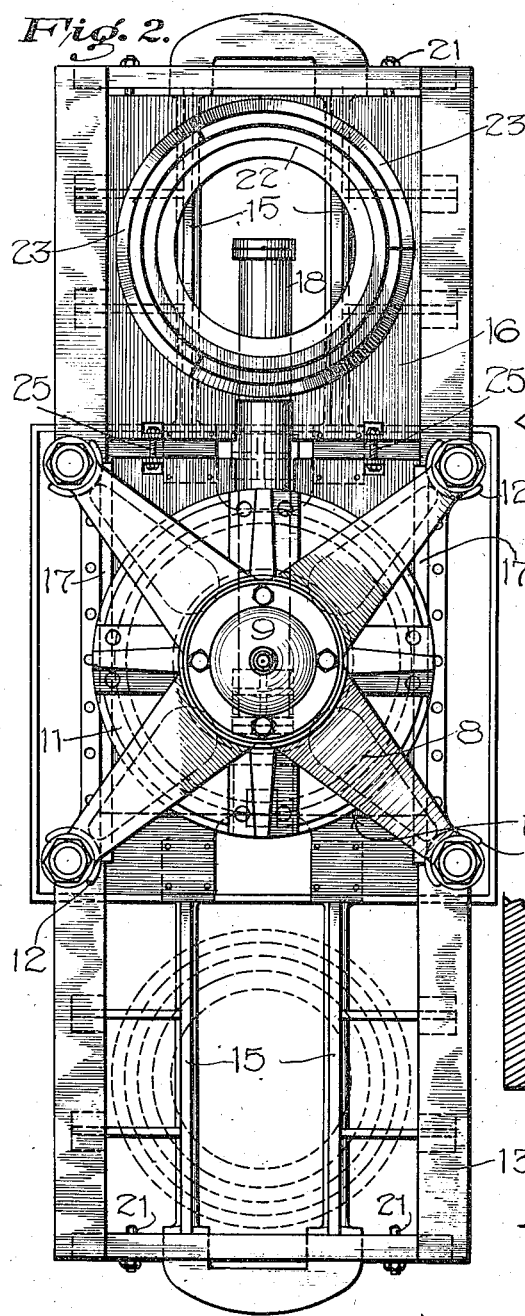
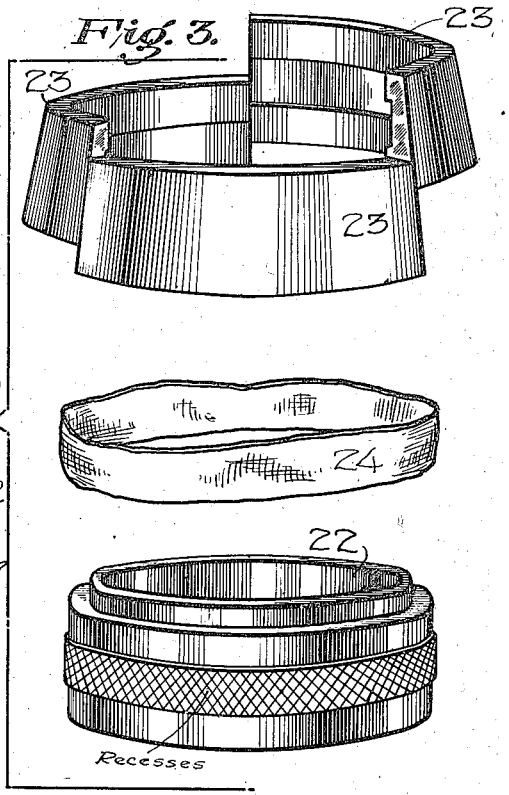
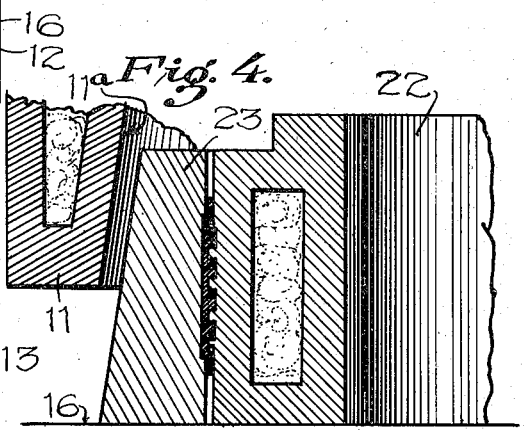
Inventor
Edward Nall
By C. L. Landon
Attorney
Witness
C. W. P. Newbold

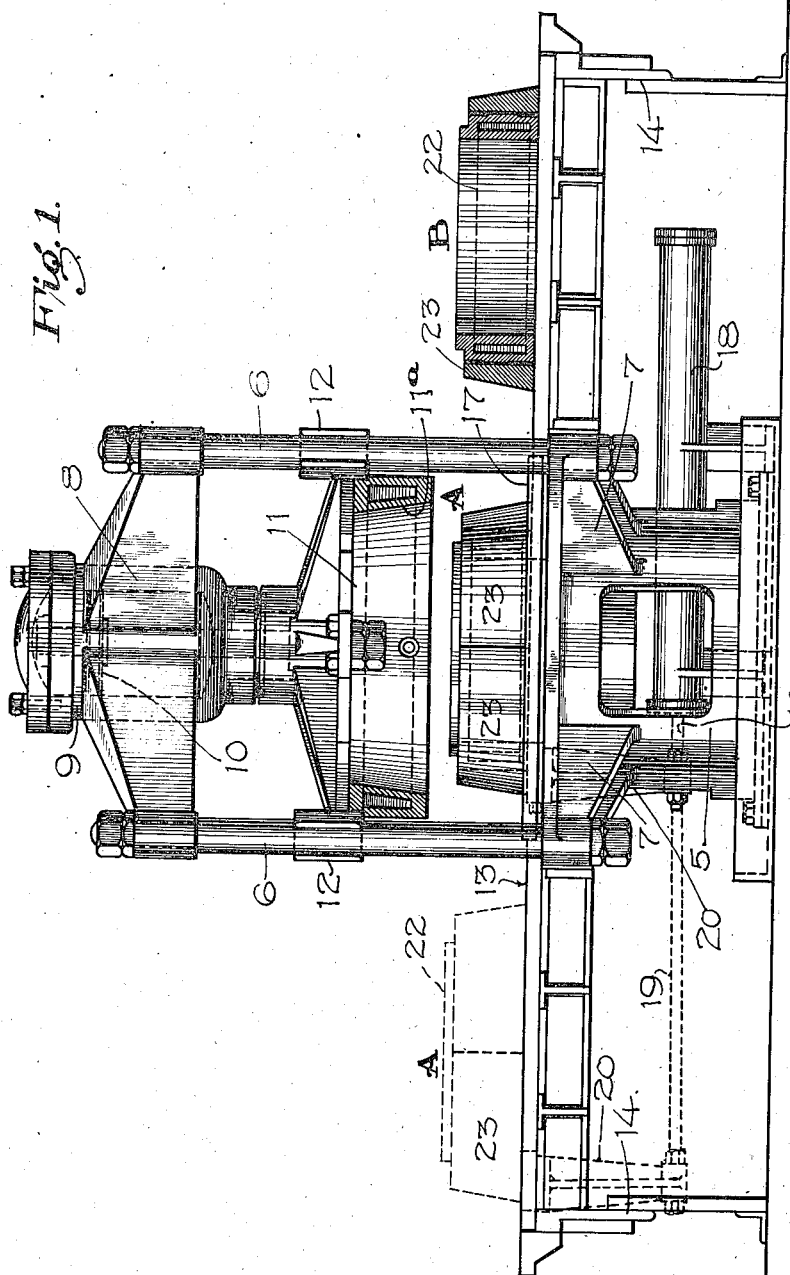

UNITED STATES PATENT OFFICE.

EDWARD NALL, OF AKRON, OHIO, ASSIGNOR TO THE GOODYEAR TIRE AND RUBBER COMPANY, OF AKRON, OHIO, A CORPORATION OF OHIO.

VULCANIZING-PRESS.

1,242,365.   Specification of Letters Patent.   Patented Oct. 9, 1917.

Application filed July 10, 1916. Serial No. 108,404.

*To all whom it may concern:*

Be it known that I, EDWARD NALL, a citizen of the United States, residing at Akron, in the county of Summit and State of Ohio, have invented new and useful Improvements in Vulcanizing-Presses.

My present invention relates to the class of vulcanizing presses and more particularly relates to a press of this character designed to impart what is known as a partial or semi-cure to non-skid tread bands for pneumatic tire casings.

As a principal object of my invention I contemplate the provision of a combined press and feeding table. The table carries a plurality of molds which contain the rubber annuli from which the non-skid tread bands are to be fabricated and which are adapted to be successively positioned beneath the press in order that the latter may operate on each in turn while the other is having the molded tread band removed therefrom and a new annulus of the rubber compound placed therein.

Another object of primary importance is to provide a tread mold *per se*, including a fixed annular mold part containing the tread matrix and a number of segmental mold parts adapted to be united, when subjected to a suitable concentric pressure, to form a continuous inclosure for the fixed matrix of the mold.

A further object of this invention is to provide a vertically movable press-member formed with a conical recess and to provide mold parts of segmental shape formed with slant outer faces for engagement with the walls of the conical recess in the press member, said mold parts being capable of assemblage by the action of said press member into a conical annulus.

A still further object of the invention is to provide a press having a vertically movable press-member and a table equipped with a slidable platform operating beneath said press-member, said platform carrying a number of molds adapted to be successively positioned, by the sliding movement of the platform, immediately below the vertically moving press-member.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a side elevational view of the preferred embodiment of my press as at present constituted;

Fig. 2 is a plan view of the same subject matter;

Fig. 3 is a composite perspective view of the matrix, of the tread band adapted to be fitted to the matrix and of the segmental mold parts adapted to force the tread band upon the matrix when subjected to the operations of the press; and Fig. 4 is a detailed sectional view taken through a fragment of the mold during the descent of the press-member.

The vertically positioned press which forms the center portion of my present vulcanizing machine is erected upon the hollow base casting or pedestal 5 and includes a number of vertical arms or standards 6 supported by the projecting brackets 7 formed integrally with the base casting. A top casting 8 is of cruciform shape and serves to anchor the upper extremities of the standards 6 upon which it is supported. Integrally formed with this top casting 8 is a cylinder 9 in which is vertically reciprocable the piston 10. Dependent from the piston 10 is the press-member casting 11 which is a substantially cylindrical member of such size as to be accommodated within the quadrangle determined by the erect standards 6, segmental sleeve bearings 12 being carried by the cylindrical member 11 for individual sliding contact with the standards 6, which thus form a guide way to control the movement of the press-member when actuated by movement of the piston 10 within its cylinder.

The press-member is formed with the frusto-conical recess 11ª opening downwardly upon a table 13 which is supported with its upper surface in alinement with the top of the base casting 5, legs or end plates 14 supporting the extremities of the table projecting on either side beyond the base casting and between lateral pairs of the standards 6. The table is of a skeleton shape and carries, below its upper surface, longitudinal sets of rails 15 upon which is supported the slidable platform 16 flush with the top of the table. Channel rails 17 are arranged upon the sides of the skeleton table to guide the platform when moving through the press proper.

Means for moving the platform 16 upon the table and through the press structure consists of a cylinder 18, which may be suitably mounted in any adequate manner within the hollow base casting 5, and a piston (not shown) movable within the cylinder and having a rod 19 connecting to a bracket arm 20 dependent from one extremity of the slidable platform. Admission of a suitable motive fluid into the cylinder, on one side or other of the piston, will serve to move the table in either direction through the press. Stops 21 are carried by the end pieces of the table 13 in order to contact with the platform end edges at their respective limits of movement away from the press. These stops are adjustable and may be relied upon to accurately determine the position of the platform with respect to the press member 11, when the table has been forced to its limit of movement in either direction.

A number of molds, here illustrated as two, are carried on the sliding platform 16 and are adapted to be respectively positioned in axial alinement with the press-member 11 in accordance with the movement of the platform upon its table.

Reference being now directed to Fig. 3 for the most part, it will be seen that each of these molds includes the annular matrix drum 22 and a number of segmental mold parts 23 which are adapted to form an inclosing ring for the matrix drum. An annular portion of the drum is formed with the intaglio impressions calculated to produce the desired projections or ridges in the tread band 24 molded thereover.

The mold parts 23 which fractionally delineate an inclosing ring for the matrix drum are provided with slant outer faces of such size as to be accommodated within the frusto-conical recess 11$^a$ of the press member 11 and the fit of these mold parts within the press member is accurately designed to force the mold parts simultaneously together, by exertion of the concentric pressure of the press-member, to determine a complete inclosing ring for the matrix.

The tread band 24 is an annulus of rubber which is usually built up of strips of varying widths in such manner that it is of greatest thickness in the center portion. This annulus is stretched over the matrix drum of the free mold (B in Fig. 1) after the segmental ring plates 23 have been separated to permit access thereto. When the tread band is in place upon the drum the plates 23 are assembled by hand to approximate the continuous inclosing ring which they will form for the matrix drum when subjected to the action of the press-member 11.

Meanwhile, the mold A at the opposite end of the sliding table has been clamped down upon by the vertically reciprocable press-member until the semi or partial cure of the tread band contained in the mold has been accomplished. At the conclusion of this vulcanization the press-member 11 is moved upwardly upon its guide standards 6 by the admission of a suitable fluid into the cylinder 9 below the piston 10. Means controlling the admission and exhaust of the fluid in contact with the piston 10 may be of such general type and known arrangement that their illustration is not necessitated as a disclosure of my invention.

When the press member 11 has been raised clear of the mold A, a suitable fluid is admitted into the cylinder 18 on the right hand side of this piston (Fig. 1) in order that the platform 16 may be slid to the opposite end of the table 13, as indicated by the dotted lines. The stops 21 at the left of the table will check the movement of the table so as not only to displace the mold A from beneath the press member but also to position the mold B in axial alinement therewith. The press member may then be moved vertically downward to exert its clamping action upon the mold B, while the segmental ring portions 23 of the mold A may be separated and the finished tread band removed from the matrix drum. When reversed this tread band is in condition for application upon a tire casing. It should be pointed out that the press member 11 and each of the matrix drums 22 is formed hollow to provide a chamber into which live steam may be admitted to accomplish the partial vulcanization of the tread band 24, the means controlling the entrance and exhaust of this steam being also of such customary character as not to require especial attention in the disclosure of this invention, since the latter is not limited to any particular type of adjuncts in this connection.

Since it is most important that movement of the sliding table to its limit of movement in either direction be such that the molds carried upon the opposite ends of the platform will be accurately positioned immediately below and in axial alinement with the press member 11, the platform is preferably constructed of the two parts illustrated in Fig. 2 which are adjustably connected by threaded couplings 25 in order that the accurate positioning of the molds may be determined.

While I have herein illustrated and described the preferred embodiment of my present invention in vulcanizing presses, I desire to emphasize the fact that such additional refinements are contemplated in later adaptations of my device as shall be capable of possible interpretation within the scope of the present claims.

What I claim is:

1. In a press of the character described, a table; a press member vertically reciprocable above said table; platforms slidably mounted upon the table for horizontal reciprocation below said press member; molds carried by respective platforms; and adjustable means linking the platforms for simultaneous movement and for positioning the molds successively in the path of travel of said press member.

2. In a press of the character described, a table; a press member vertically reciprocable above said table and arranged for intermittent contact with the surface thereof; platforms slidably mounted flush with the surface of said table for reciprocation below said press member; adjustable means projecting from the extremities of the table to contact with opposite platforms in limiting simultaneous movement of the platforms in either direction; and means adjustably linking said platforms for simultaneous movement, both of said adjustable means operating in conjunction to center said platforms successively in path of travel of said press member.

3. In a press of the character described, a mold including a drum interiorly formed with a live steam chamber and an inclosing annulus for the drum composed of independent segmental parts, each of said parts having a slant outer face; and means contacting with the slant faces of all of the said segmental parts to provide a pressure concentric with the drum in forcing said parts into a tight inclosure of the drum.

4. In a press of the character described, a matrix drum formed on its exterior face with intaglio impressions and provided interiorly with a live steam chamber; segmental members forming the fractional parts of a complete annulus for said drum, each member being formed with a slant outer face and a press member provided with a frusto-conical recess, the walls of which are interiorly provided with a live steam chamber, said member being adapted to inclose both the drum and the segmental inclosing drum annulus by a snug fit exerting sufficient pressure upon the slant faces of the segmental members to correlate them into a continuous ring.

5. In a press of the character described, a mold including a matrix drum formed with intaglio impressions upon its exterior face and being interiorly formed with a chamber for live steam; a press member adapted to close over the mold, said press member being provided with a conical recess of greater diameter than the drum and also provided with an interior live steam chamber; and segmental members forming the fractional parts of a complete annulus, said members being interpositioned between said drum and the walls of the recess in the press member, the members having slant outer faces for contact with the conical recess of said press member.

6. In a press of the character described, a table; a press member vertically reciprocable about said table; said press member being formed with an interior conical recess surrounded by a steam chamber; platforms reciprocable upon said table below the press member; a matrix drum fixed relatively to each platform; a loose inclosing annulus for each matrix drum defined by fractionally mating members, and independent means for moving said press member and the platforms, whereby the matrix molds with their inclosing annuli may be successively positioned in axial alinement with the recessed press member in order that the latter may group the fractional components of said annuli into a firm inclosure upon their respective drums.

In testimony whereof I have signed my name in the presence of two subscribing witnesses.

EDWARD NALL.

Witnesses:
LELA WAGNER,
C. V. P. NEWBOLD.